(12) United States Patent
Matsui

(10) Patent No.: US 10,742,006 B1
(45) Date of Patent: Aug. 11, 2020

(54) CABLE FIXATION STRUCTURE

(71) Applicant: FANUC CORPORATION, Yamanashi (JP)

(72) Inventor: Hideo Matsui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/715,269

(22) Filed: Dec. 16, 2019

(30) Foreign Application Priority Data

Feb. 27, 2019 (JP) ................. 2019-033901

(51) Int. Cl.
*H02G 3/04* (2006.01)
*H02G 15/013* (2006.01)
*H02G 11/00* (2006.01)

(52) U.S. Cl.
CPC ......... *H02G 3/0406* (2013.01); *H02G 3/0481* (2013.01); *H02G 11/00* (2013.01); *H02G 15/013* (2013.01)

(58) Field of Classification Search
CPC .. H02G 3/0406; H02G 15/013; H02G 3/0481; H02G 11/00

USPC ........................................................ 174/70 R
See application file for complete search history.

(56) References Cited

U.S. PATENT DOCUMENTS

| 2014/0196929 A1* | 7/2014 | Okuhara | ................. F16L 11/11 |
| | | | 174/68.3 |
| 2014/0224945 A1* | 8/2014 | Okuhara | ................. H02G 3/30 |
| | | | 248/74.1 |

FOREIGN PATENT DOCUMENTS

| JP | H02-311294 A | 12/1990 |
| JP | 2003-235124 A | 8/2003 |

* cited by examiner

*Primary Examiner* — Sherman Ng
(74) *Attorney, Agent, or Firm* — Maier & Maier, PLLC

(57) ABSTRACT

Fixation structure for a cable, and the fixation structure includes a fixation member configured to be fixed to a structural body and a fixing member configured to fix the cable covered by a tube to the fixation member, where a cut-out for exposing an outer periphery surface of the cable at a portion middle of the cable in a longitudinal direction is provided at an end of the tube, and the cable and the tube are fastened and fixed to the fixation member by fastening the fixing member disposed within the cut-out in a state in which a part of the tube at a position corresponding to the cut-out is sandwiched between the cable and the fixation member.

3 Claims, 9 Drawing Sheets

CABLE FIXATION STRUCTURE

CROSS-REFERENCE TO RELATED APPLICATIONS

This application is based on and claims priority to Japanese Patent Application No. 2019-033901 filed on Feb. 27, 2019, the content of which is incorporated herein by reference in its entirety.

FIELD

The present disclosure relates to a cable fixation structure.

BACKGROUND ART

Conventionally, there is known a cable fixation structure in which a heat-shrinkable tube is provided at each end of a cable, and one of the ends of the cable that is inserted through a wiring hole is supported at a position of the heat-shrinkable tube by a fixing band over the heat-shrinkable tube (cf., Japanese Unexamined Patent Application Publication No. H02-311294).

SUMMARY

One aspect of the present disclosure provides a cable fixation structure including: a fixation member configured to be fixed to a structural body; and a fixing member configured to fix a cable covered by a tube to the fixation member, wherein an end of the tube is provided with a cut-out for exposing an outer periphery surface of the cable at a portion middle of the cable in its longitudinal direction, and the cable and the tube are fastened and fixed to the fixation member by fastening the fixing member disposed within the cut-out in a state in which a part of the tube at a position corresponding to the cut-out is sandwiched between the cable and the fixation member.

DETAILED DESCRIPTION

Hereinafter, a fixation structure 1 for a cable 2 according to an embodiment of the present disclosure will be described with reference to the drawings.

Figure 1:
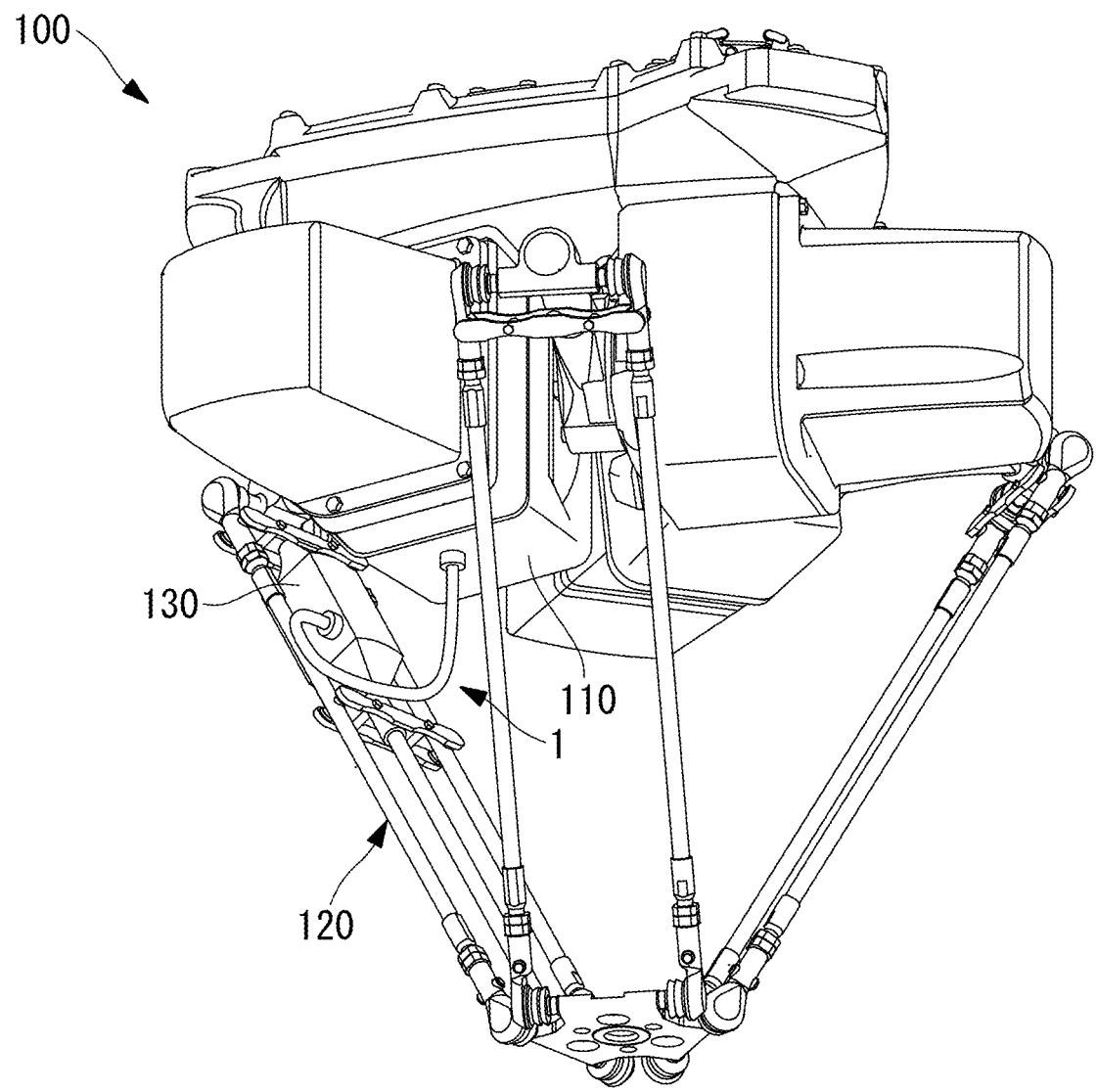
FIG. 1 is a side view showing one example of a robot to which a cable fixation structure according to one embodiment of the present disclosure is applied.
Figure 2:
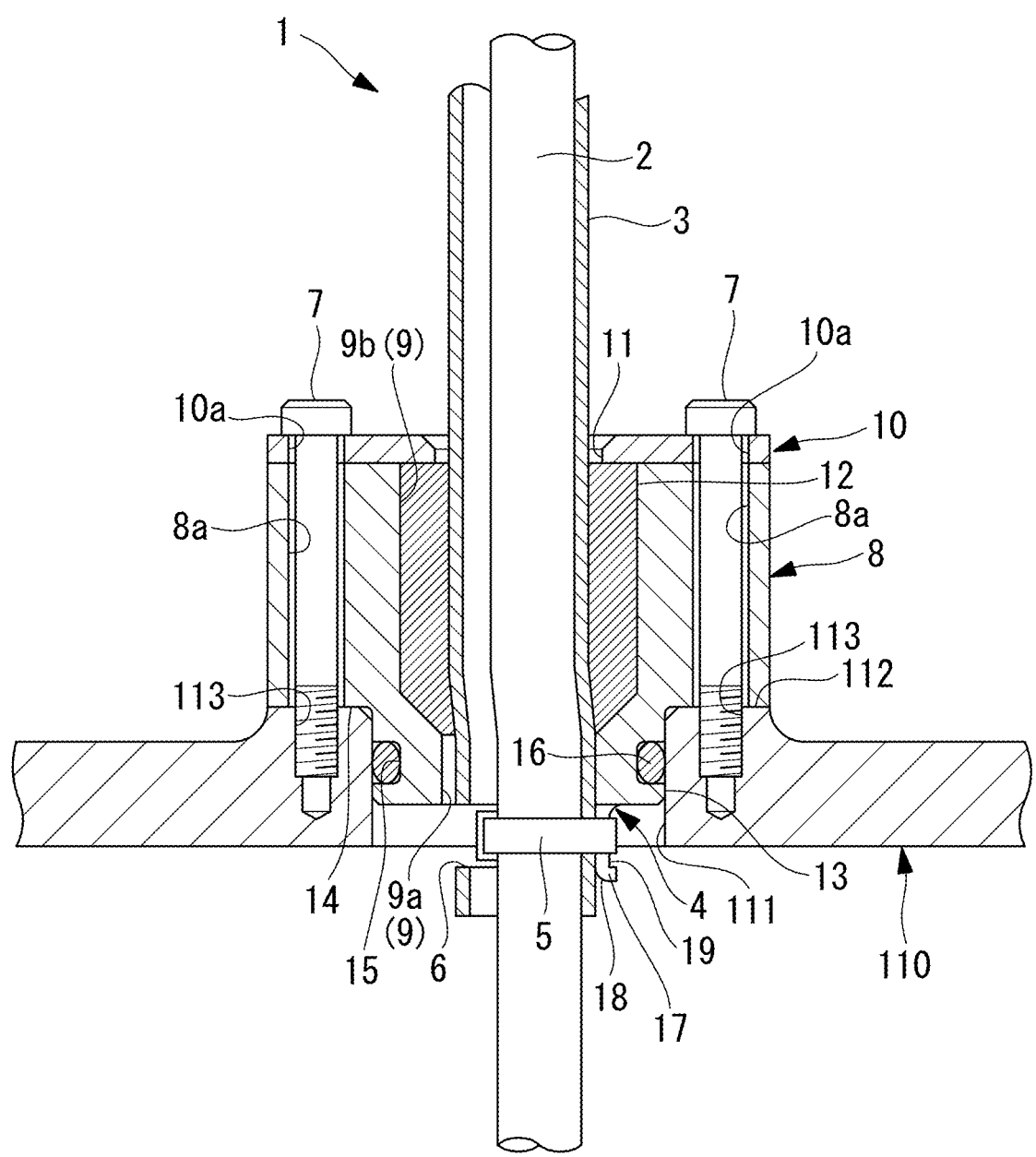
FIG. 2 is a longitudinal sectional view for illustration of the cable fixation structure shown in FIG. 1.

As shown in FIG. 1, for example, the fixation structure 1 for the cable 2 according to this embodiment is a fixation structure between a base 110 of a parallel link robot 100 and the cable 2 as a movable cable for supplying electric power and signals to a motor (not shown) attached to an arm 120 movable relative to the base (structural body) 110. As shown in FIG. 2, the cable 2 is covered by a protection tube (tube) 3 made of a flexible plastic.

The motor is contained within a sealed housing (structural body) 130. Outer walls of the base 110 and the housing 130 are respectively provided with cable holes 111 having a circular cross-section through which the cable 2 covered by the protection tube 3 is inserted.

As shown in FIG. 2, the fixation structure 1 is provided with a fixation member 4 removably attached to each of the cable holes 111 respectively of the base 110 and the housing 130, and a fixing band (fixing member) 5 for fixing the fixation member 4 to the cable 2. One example of the fixing band 5 is a plastic banding belt. At a position along a longitudinal direction of the protection tube 3 corresponding to a fixation position to the fixation member 4, a cut-out 6 is provided in advance by cutting out a part of the protection tube 3 along a circumferential direction, the part has a width dimension greater than a width of the fixing band 5.

Figure 4:
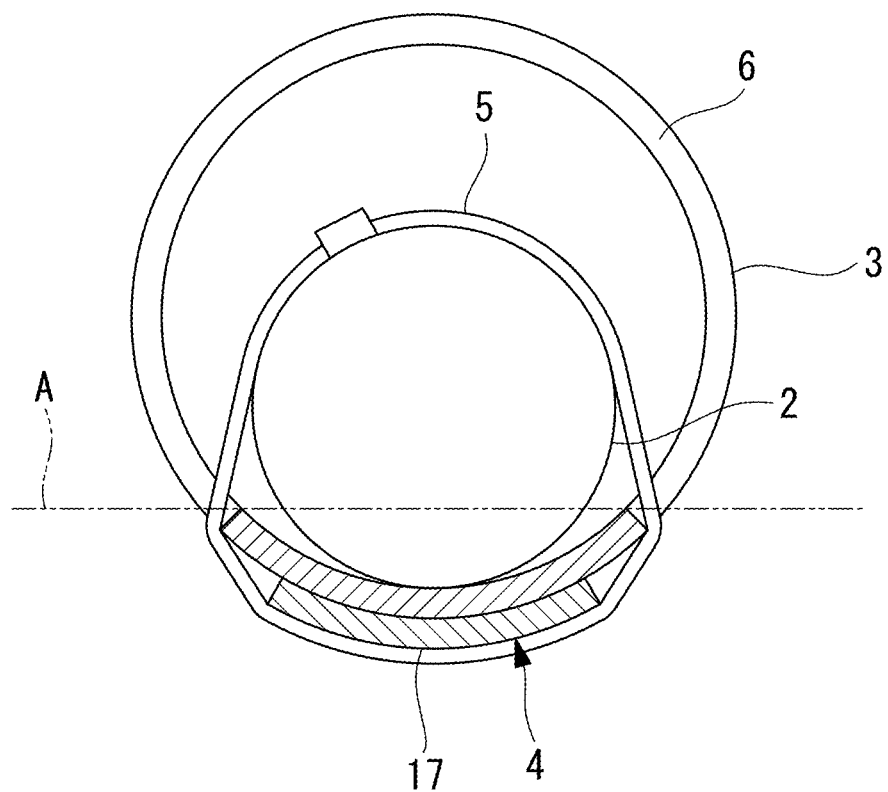
FIG. 4 is a cross-sectional view showing a state in which the cable, a protection tube, and the fixation member that are shown in FIG. 2 are fastened by a fixing band.
Figure 5:
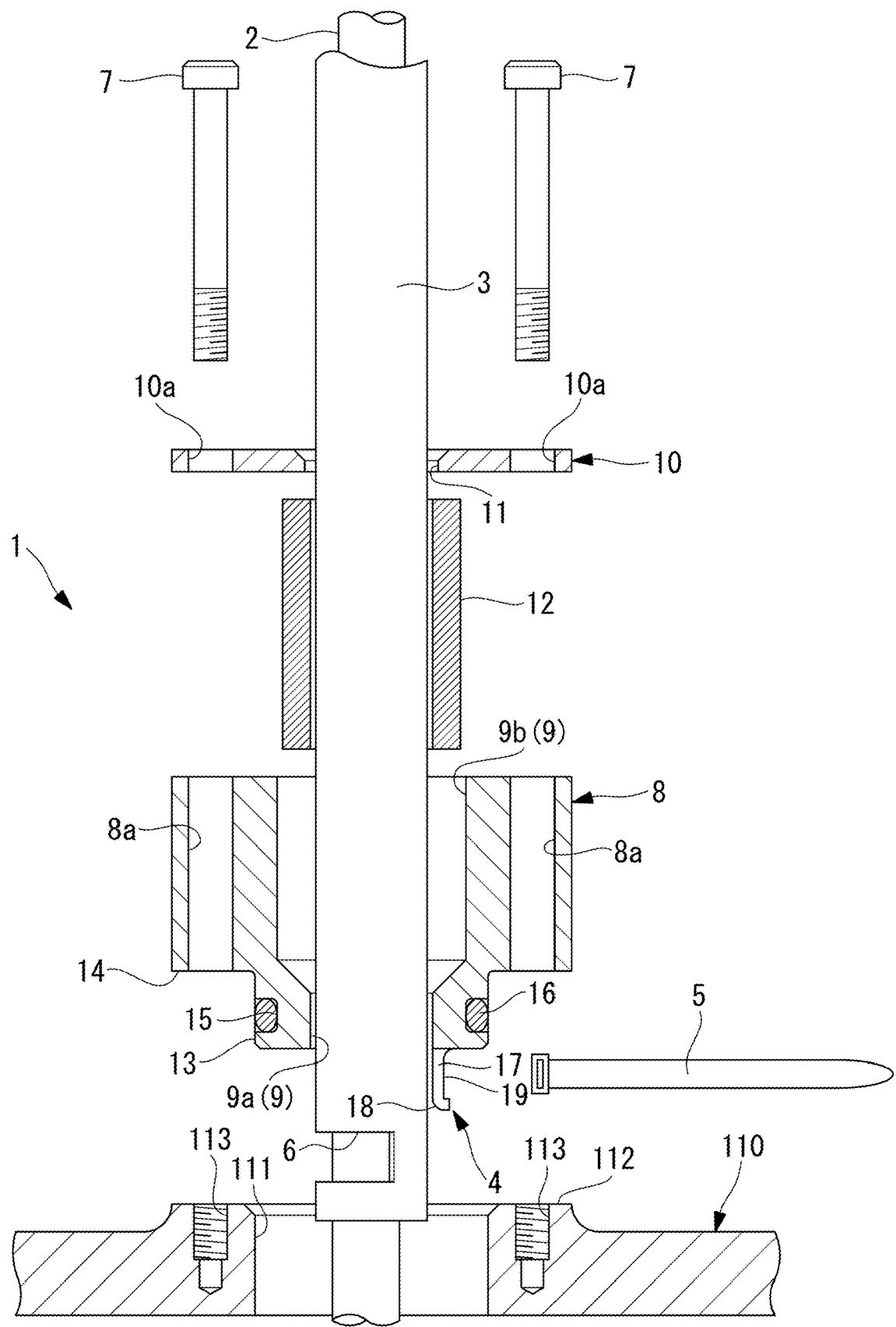
FIG. 5 is an exploded longitudinal sectional view for illustration of a step of fixing a cable to a base using the fixation structure shown in FIG. 2.

As shown in FIG. 4, the size of the cut-out 6 is such that when the cable 2 disposed in the protection tube 3 is placed so as to be in close contact with an inner surface of the protection tube 3 that is left after providing the cut-out 6, the cable 2 projects outside a straight line A connecting both ends of the cut-out 6 in a circumferential direction. As shown in FIG. 5, a bearing surface 112 with which the fixation member 4 is abutted is provided around the cable hole 111 of either of the base 110 and the housing 130, and the bearing surface 112 includes a plurality of, for example, four thread holes 113 for fastening threads 7 for fixing the fixation member 4 with intervals from each other in the circumferential direction.

Figure 3:
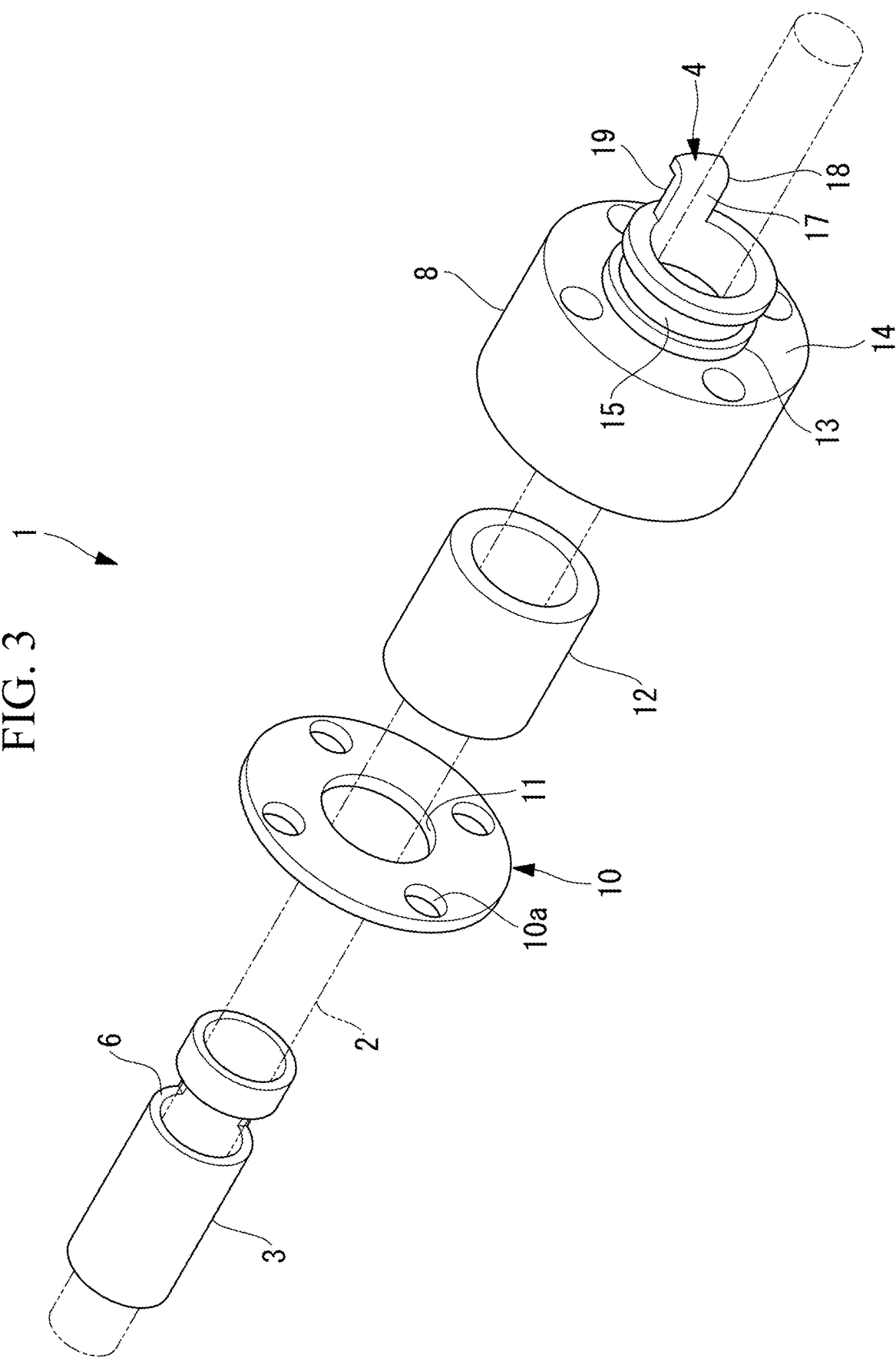
FIG. 3 is an exploded perspective view showing a fixation member used for the cable fixation structure shown in FIG. 2.

As shown in FIG. 3, the fixation member 4 includes: a cylindrical member 8 having a through hole 9 through which the cable 2 and the protection tube 3 are inserted; a ring-plate member (compression member) 10 having a center hole 11 through which the cable 2 and the protection tube 3 are inserted; and a cylindrical elastic member 12 contained within the through hole 9 of the cylindrical member 8. One end of the cylindrical member 8 in an axial direction includes: a cylindrical fitting portion 13 that can be fitted into the cable hole 111 of either of the base 110 and the housing 130; and a stepped portion 14 that is abutted with a butting surface in a state in which the fitting portion 13 is fitted in the cable hole 111. A circumferential groove 15 is provided over an entire circumference of an outer periphery surface of the fitting portion 13, and an O-ring (sealing member) 16 is arranged in the circumferential groove 15.

Further, at a tip end of the fitting portion 13 of the cylindrical member 8, a fastening portion 17 is provided by extending a part of an inner periphery surface of the through hole 9 in the circumferential direction, for example, an inner periphery surface of an angle range around 60 degrees in a direction parallel with an axial line of the through hole 9. A curved surface 18 that extends radially outward to the tip end is provided at a tip end of the fastening portion 17, and a groove 19 for holding the fixing band 5 is provided on a surface radially outside the fastening portion 17.

The through hole 9 of the cylindrical member 8 includes: a small-diameter portion 9a that is at one end in the axial direction, and whose inner diameter is slightly larger than an outer diameter of the protection tube 3; and a large-diameter portion 9b that is at the other end in the axial direction, and whose inner diameter is larger than the small-diameter portion 9a. An inner diameter of the center hole 11 of the ring-plate member 10 is larger than the outer diameter of the protection tube 3, and smaller than the inner diameter of the large-diameter portion 9b. Radially outside the through hole 9 of the cylindrical member 8 and radially outside the center hole 11 of the ring-plate member 10, a plurality of screw holes 8a and 10a through which the threads 7 are inserted in the axial direction are disposed with intervals from each other in the circumferential direction.

The elastic member 12 is made of an elastic material such as rubber. A size of the elastic member 12 is such that the elastic member 12 can be inserted in a cylindrical gap between an inner surface of the large-diameter portion 9b of the through hole 9 of the cylindrical member 8 and an outer surface of the protection tube 3 inserted through the through hole 9, and a length of the elastic member 12 is such that the elastic member 12 extends outside from an end surface of the cylindrical member 8 in a state in which the elastic member 12 is contained in the gap.

Hereinafter, the fixation structure 1 for the cable 2 according to this embodiment thus configured will be described. As shown in FIG. 3 and FIG. 5, in order to fix the cable 2 with the protection tube 3 to the base 110 and the housing 130 using the fixation structure 1 according to this embodiment, the cable 2 with the protection tube 3 is inserted from its end into the center hole 11 of the ring-plate member 10, an internal hole of the elastic member 12, and then the through hole 9 of the cylindrical member 8 in the stated order. As a method of fixation to the base 110 is the same as a method of fixation to the housing 130, a case in which the fixation is carried out to the base 110 will be described in the following.

Figure 6:
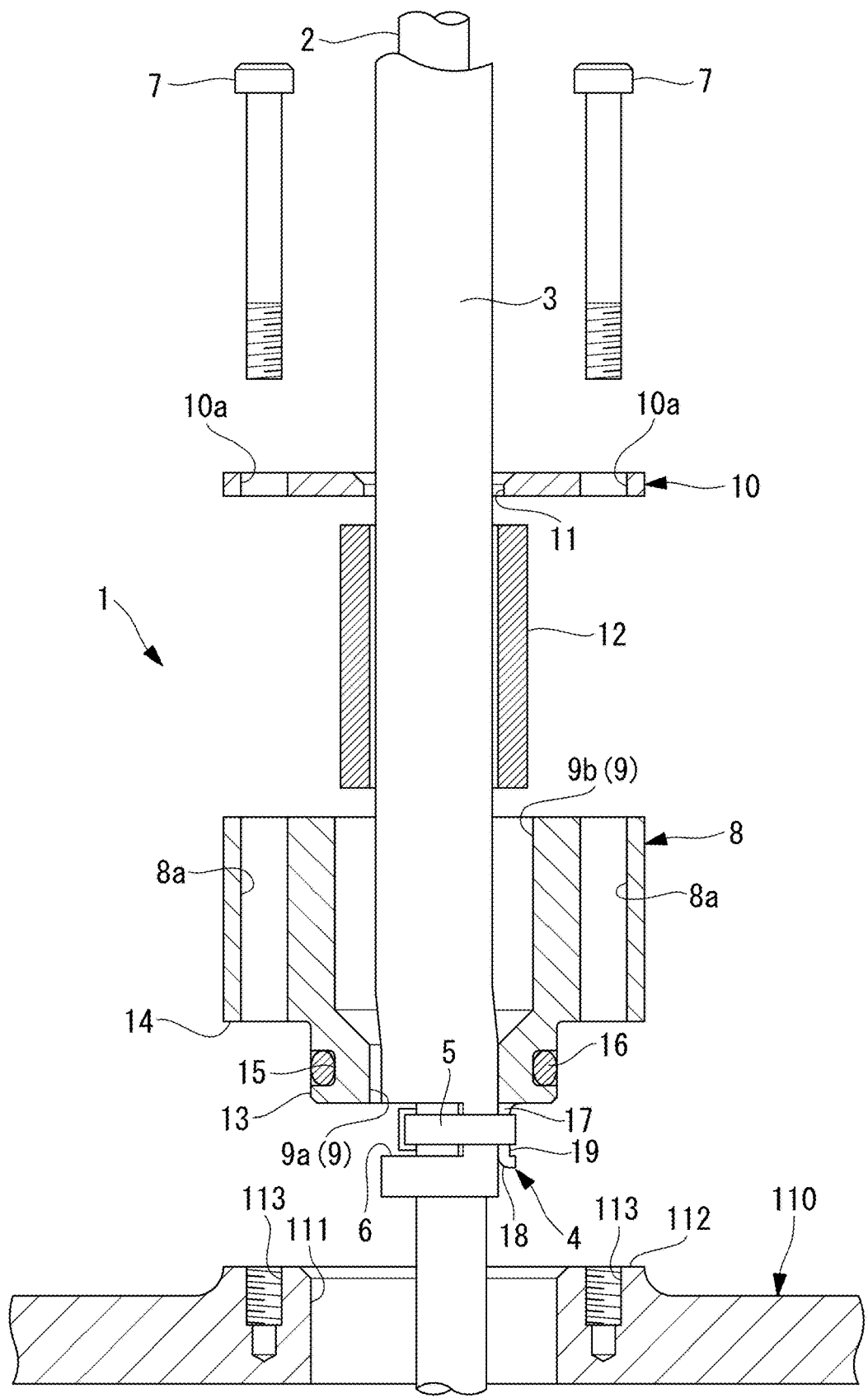
FIG. 6 is an exploded longitudinal sectional view showing a state in which the cable and the protection tube are fixed to a cylindrical member of the fixation structure shown in FIG. 5.

As shown in FIG. 6, the cut-out 6 of the protection tube 3 is positioned at the fastening portion 17 of the cylindrical member 8, and the fixing band 5 is wound around the cable 2, the protection tube 3, and the fastening portion 17 at the cut-out 6, and then the fixing band 5 is fastened. As a result, the fixing band 5 binds the cable 2 and the fastening portion 17 in a state in which the protection tube 3 is sandwiched between the cable 2 and the fastening portion 17, and therefore the cable 2 and the protection tube 3 are fastened and fixed to the fastening portion 17. As the fixing band 5 is contained in the groove 19 of the fastening portion 17, the cable 2 and the protection tube 3 are fixed to the cylindrical member 8 so as not to move in the longitudinal direction.

Figure 7:
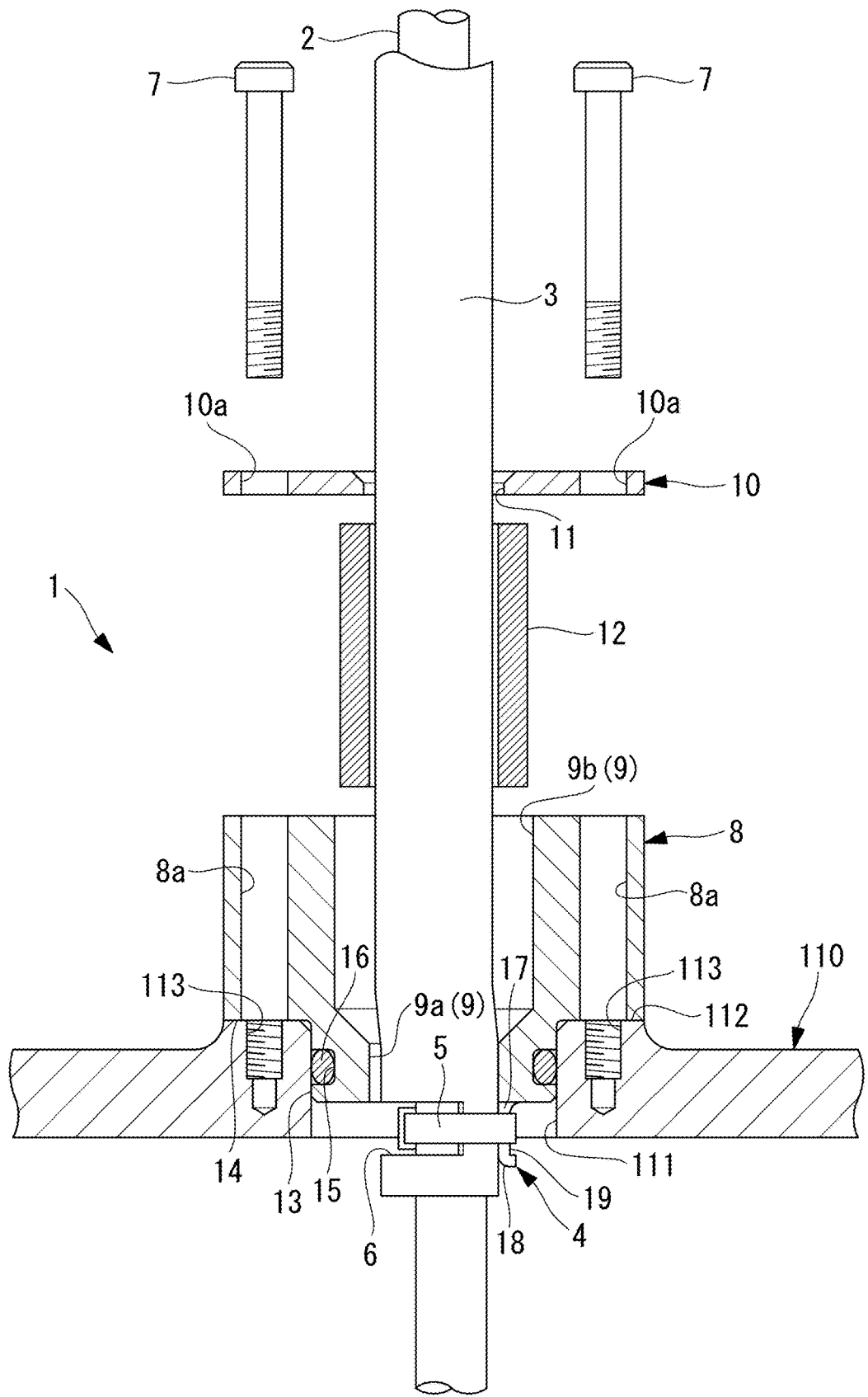
FIG. 7 is an exploded longitudinal sectional view showing a state in which the cylindrical member that fixes the cable and the protection tube in FIG. 6 is fitted in a cable hole of the base.

As shown in FIG. 7, in this state, the fitting portion 13 of the cylindrical member 8 is fitted within the cable hole 111 provided on an outer wall of the base 110, and the stepped portion 14 of the cylindrical member 8 is abutted with the bearing surface 112 of the base 110. By the fitting of the fitting portion 13 of the cylindrical member 8 with the cable hole 111 of the base 110, the O-ring 16 is squeezed between an outer surface of the fitting portion 13 and an inner surface of the cable hole 111. Thus, the gap therebetween is sealed.

Figure 8:
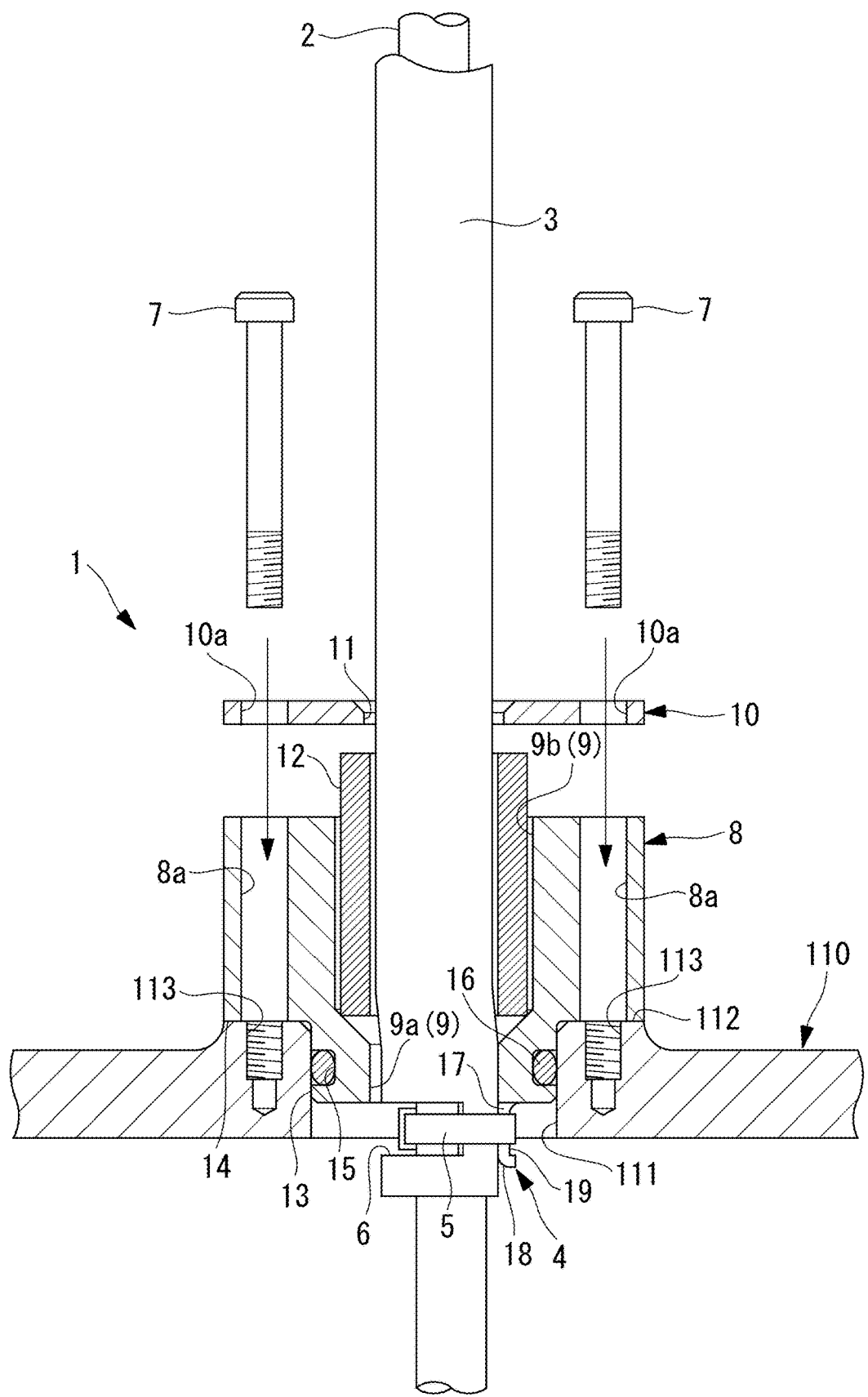
FIG. 8 is an exploded longitudinal sectional view showing a state in which an elastic member is inserted into a large-diameter portion of the cylindrical member shown in FIG. 7.

Then, as shown in FIG. 8, the cylindrical elastic member 12 is inserted into the cylindrical gap between the inner surface of the large-diameter portion 9b of the cylindrical member 8 and the outer surface of the protection tube 3, and the ring-plate member 10 is abutted with the end of the elastic member 12. In this state, the threads 7 inserted through the screw holes 8a, 10a provided on the ring-plate member 10 and the cylindrical member 8 are fastened into the thread holes 113 provided on the bearing surface 112. As a result, as shown in FIG. 2, the cylindrical member 8 is fixed to the outer wall of the base 110.

With this, the ring-plate member 10 compresses the elastic member 12 in the axial direction, the elastic member 12 expands radially outward and radially inward, and the gap between the inner surface of the large-diameter portion 9b of the cylindrical member 8 and the outer surface of the protection tube 3 is sealed. In addition, a friction between the elastic member 12 and the inner surface of the large-diameter portion 9b, and a friction between the elastic member 12 and the outer surface of the protection tube 3 increase, and fixing power between the protection tube 3 and the cylindrical member 8 in the axial direction and in the circumferential direction further improve. Thus, the fixation of the cable 2 to the base 110 using the fixation structure 1 according to this embodiment is completed. Fixation to the housing 130 may be carried out in the same manner.

As described above, according to the fixation structure 1 of the cable 2 in this embodiment, the protection tube 3 and the cable 2 are fixed to the cylindrical member 8 by fastening the cable 2, the protection tube 3, and the fastening portion 17 of the cylindrical member 8 using the fixing band 5 at the position of the cut-out 6 provided in the protection tube 3. Then, by fixing the cylindrical member 8 to the structural body, the cable 2 covered by the protection tube 3 may be fixed to the structural body.

In this case, there is an advantage that only by providing the cut-out 6 in the protection tube 3, and fastening the cable 2 to the fastening portion 17 by the fixing band 5 at the position of the cut-out 6, the protection tube 3 as well as the cable 2 may be easily fixed to the cylindrical member 8. That is, according to this embodiment, the protection tube 3 and the cable 2 are easily fixed to the cylindrical member 8 even when the cable 2 and the protection tube 3 are not in close contact with each other.

Further, the protection tube 3 is held so as not to be removed with regard to the cylindrical member 8 in the longitudinal direction by fastening of the fixing band 5, in addition to the frictions of the protection tube 3 and the elastic member 12. Therefore, even when the cable 2 is continuously moved, especially like a case in which the cable 2 is a movable cable, there is an advantage that the protection tube 3 can be more reliably prevented from coming off from the base 110 or the housing 130.

Moreover, as the space between the protection tube 3 and the cylindrical member 8 is sealed by the elastic member 12, and the spaces between the respective cylindrical members 8 and the base 110 and the housing 130 are sealed by the O-rings 16, it is possible to prevent liquid drops or dusts from entering the base 110 and the housing 130. Furthermore, by carrying out the fastening with the plastic protection tube 3 sandwiched between the cylindrical member 8 and the cable 2, the protection tube 3 may serve as a buffer material and breakage of a sheath of the cable 2 may be prevented. In addition, when the cylindrical member 8 is made of a metallic material, even if the sheath is broken, the protection tube 3 prevents a cable core of the cable 2 from being brought into contact with the cylindrical member 8 to cause an earth fault.

According to this embodiment, the example of application to a movable cable that connects the base 110 and the housing 130 of the parallel link robot 100 has been described. However, an application of the present disclosure is not limited to this example, and the present disclosure may be applied to the fixation structure 1 for any movable cable or any fixed cable of any other apparatus. Further, while the example in which the elastic member 12 and the O-ring 16 provide a liquid-resistant or dust-resistant structure has been described, it is not necessary to provide the elastic member 12 and the O-ring 16.

Moreover, while the example in which the cable 2 that is inserted through the cable holes 111 provided on the base 110 and the housing 130 is fixed has been described, the present disclosure may be applied to a case in which the cable 2 with the protection tube 3 is fixed by the fixation member 4 of any shape.

Furthermore, while the example where a middle portion of the protection tube 3 in the longitudinal direction is partially cut out as the cut-out 6 provided on the protection tube 3 has been described, an end of the protection tube 3 may be partially cut out. In addition, while the example in which the plastic fixing band 5 is employed as the fixing member has been described, any fixing member may be employed in this place.

Figure 9:
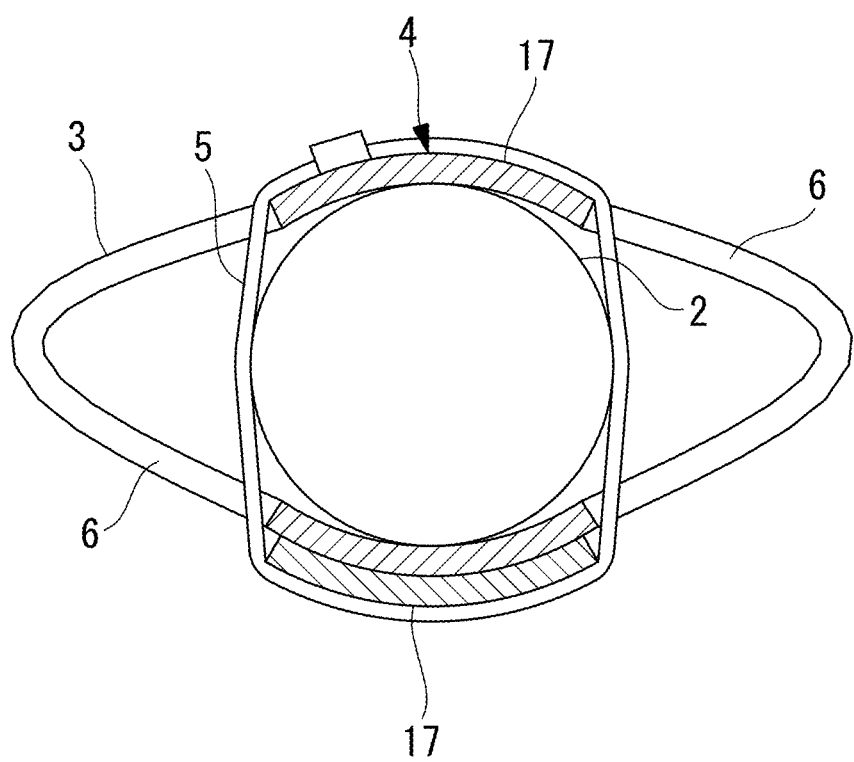
FIG. 9 is a cross-sectional view showing a modified example of the example shown in FIG. 4.

Further, while the example in which the cut-out 6 is provided at a part of the protection tube 3 in the circumferential direction has been described, it is possible to provide the fastening, as shown in FIG. 9, using two cut-outs 6 provided at two positions with intervals in the circumferential direction.

The invention claimed is:

1. A cable fixation structure comprising: a fixation member configured to be fixed to a structural body; and a fixing member configured to fix a cable covered by a tube to the fixation member, wherein an end of the tube is provided with a cut-out for exposing an outer periphery surface of the cable at a portion middle of the cable in its longitudinal direction, and the cable and the tube are fastened and fixed to the fixation member by fastening the fixing member disposed within the cutout in a state in which a part of the tube at a position corresponding to the cut-out is sandwiched between the cable and the fixation member, wherein the fixation member includes: a through hole through which the tube and the cable are inserted; a tubular elastic member disposed between an inner wall of the through hole and an outer periphery surface of the tube, the tubular elastic member sealing a gap between the tube and the through hole by radial expansion of the tubular elastic member by being compressed in an axial direction of the tubular member; a compression member configured to compress the tubular elastic member in the axial direction; and a fastening portion configured to fasten the fixation member.

2. The cable fixation structure according to claim 1, wherein the structural body is provided with an outer wall, the outer wall is provided with a cable hole through which the tube and the cable are inserted, the fixation member is provided with a fitting portion configured to be removably fitted in the cable hole so that the fastening portion is disposed within the outer wall, and a sealing member is provided to seal a gap between the fitting portion and the cable hole.

3. The cable fixation structure according to claim 1, wherein the cable is a movable cable.

* * * * *